P. LONG.
Cultivators.
No. 139,320.    Patented May 27, 1873.
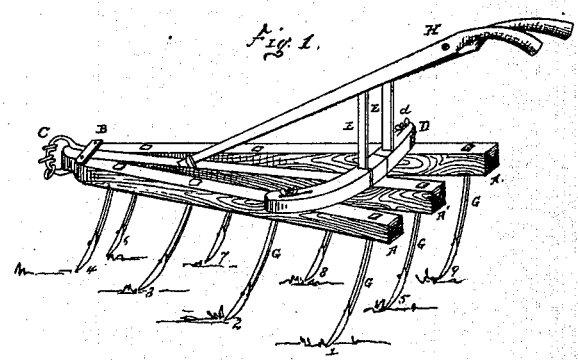
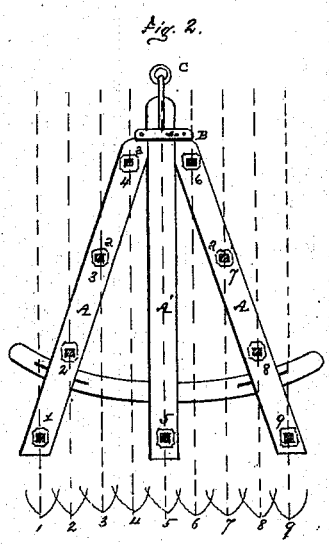
Witnesses.
M. A. Stauffer
J. C. Berger
Inventor.
Philip Long.
per J. Stauffer Att'y

UNITED STATES PATENT OFFICE.

PHILIP LONG, OF PENN TOWNSHIP, NEAR JUNCTION RAILROAD STATION, COUNTY OF LANCASTER, PENNSYLVANIA, ASSIGNOR OF ONE-HALF HIS RIGHT TO JOHN M. PHILLIPS, OF SAME PLACE.

IMPROVEMENT IN CULTIVATORS.

Specification forming part of Letters Patent No. 139,320, dated May 27, 1873; application filed January 25, 1873.

*To all whom it may concern:*

Be it known that I, PHILIP LONG, of Penn township, (near the Junction Railroad Station,) in the county of Lancaster, and State of Pennsylvania, have invented certain Improvements in a Cultivator, specially adapted for preparing the ground for tobacco-culture previously planted with Indian corn, for grubbing up the stubble and subsequent culture, of which the following is a specification:

The drawings illustrate the construction and arrangement.

Figure 1 is a perspective view. Fig. 2 shows the arrangement of the shovels and their equidistant scores parallel to each other.

I am aware that it does not seem to differ from ordinary cultivators, nor do I claim any novelty as regards the center-beam A' and the hinged wings A A, the yoke B, clevis C, or handles H, with their supports E, and the adjusting device D d, as such are common.

The superior efficacy for obtaining new and improved results in this consists in the manner of arranging nine narrow shovels (on wooden beams) with long iron shanks or supports G, which supports are made square, and made to pass through iron bush-plates a, inserted flush into the under side of the beam, and secured above by an ordinary nut, but so set in the wood as to be parallel with each other, as indicated by the lines 1, 2, 3, 4, 5, 6, 7, 8, and 9; thus a light draft and a light machine is had, and all the advantages of a two-horse cultivator of the best class, is provided, that one horse can draw with ease. The narrow pointed elliptic shovels G are calculated to penetrate the arable soil nearly their entire length, so that, like a harrow, the pulverized soil passes around the upper points, and leaves no clogs nor deep furrows on the surface, but the shovels, say three and one-fourth inches wide centrally, being immersed in the soil, slightly over-cut each other, and yet, by their arrangement on the long supports, there is no tendency to clog up, as with the hook-beam iron cultivators, which are found defective for grubbing up the corn-stubble of the previous year, as is the custom, to prepare the field for tobacco-culture. To provide an implement for one horse that is specially adapted for grubbing up the corn-stubble and thoroughly pulverizing the soil, as well as for working corn or tobacco between the rows with satisfaction, has led to the arrangement here presented, which fully meets the object. The merit of its superiority arises from its lightness, and from the long square shovel-stems G, inserted in the iron bush-plates a and wooden beams, so as to be in line with the parallel draft of the center shovel. The narrow pointed elliptic shovels affixed centrally are common, but as a whole, the cultivator is especially adapted to the uses referred to.

Therefore, what I claim as my invention is—

The above described three-beam cultivator, with long standards passing through inserted bush-plates, and narrow pointed shovels; the frame adjustable as to width at the front by means of the peculiar hinge and plate, with the curved slotted-bar and set-screws at the rear, all combined and arranged substantially as set forth.

PHILIP LONG.

Witnesses:
A. B. REIDENBACH,
LOUIS S. LIGHT.